US00RE46256E

(19) United States
(12) Reissued Patent
Hardman et al.

(10) Patent Number: US RE46,256 E
(45) Date of Reissued Patent: Dec. 27, 2016

(54) ASYMMETRIC TOPOLOGY TO BOOST LOW LOAD EFFICIENCY IN MULTI-PHASE SWITCH-MODE POWER CONVERSION

(71) Applicants: Advanced Micro Devices, Inc., Sunnyvale, CA (US); ATI TECHNOLOGIES ULC, Markham (CA)

(72) Inventors: Peter Thomas Hardman, Kyle, TX (US); Erwin Pang, Markham (CA); Sanjiv K. Lakhanpal, Austin, TX (US)

(73) Assignees: Advanced Micro Devices, Inc., Sunnyvale, CA (US); ATI Technologies ULC, Markham, Ontario (CA)

(21) Appl. No.: 13/902,145

(22) Filed: May 24, 2013

Related U.S. Patent Documents

Reissue of:

(64) Patent No.: 7,948,222
Issued: May 24, 2011
Appl. No.: 12/366,233
Filed: Feb. 5, 2009

(51) Int. Cl.
*G05F 1/10* (2006.01)
*G05F 1/00* (2006.01)

(52) U.S. Cl.
CPC ..... *G05F 1/00* (2013.01)

(58) Field of Classification Search
CPC .... H02M 3/1584; H02M 3/1588; G05F 1/563; G05F 1/00
USPC ..... 323/272, 283, 284; 363/65
See application file for complete search history.

(56) References Cited

U.S. PATENT DOCUMENTS

| | | | |
|---|---|---|---|
| 2,605,310 | A | 7/1952 | White |
| 2,820,941 | A | 1/1958 | Berkery |
| 3,013,165 | A | 12/1961 | Bataille |
| 3,122,677 | A | 2/1964 | Flieder |
| 3,179,818 | A | 4/1965 | Urban |
| 3,192,441 | A | 6/1965 | Wright |
| 3,192,468 | A | 6/1965 | Buchanan et al. |
| 3,204,172 | A | 8/1965 | Darling et al. |

(Continued)

OTHER PUBLICATIONS

George Schuellein, "Multiphase Buck Converter Design Responds Well to Transients", EE Times, <http://www.eetimes.com/document.asp?doc_id=1224753>, Sep. 13, 2000, 15 pages.

(Continued)

*Primary Examiner* — My Trang Ton

(57) ABSTRACT

Techniques for performing DC to DC power conversion in switch-mode converter circuits include combinations of dynamic switch shedding, phase shedding, symmetric phase circuit topologies, and asymmetric phase circuit topologies. In at least one embodiment of the invention, a method of operating a power converter circuit includes operating a first phase switch circuit portion using a first number of switch devices when the power converter circuit is configured in a first mode of operation. The first number is greater than zero. The method includes operating the first phase switch circuit portion using the first number of switch devices when the power converter circuit is configured in a second mode of operation. The method includes operating a second phase switch circuit portion using a second number of switch devices when the power converter circuit is configured in the second mode of operation. The second number is greater than the first number.

21 Claims, 6 Drawing Sheets

(56) References Cited

U.S. PATENT DOCUMENTS 3,215,925 A 11/1965 Rieke
3,218,542 A 11/1965 Taylor
3,226,630 A 12/1965 Lampke
3,263,099 A 7/1966 Bedford
3,286,157 A 11/1966 Leostic
3,317,820 A 5/1967 Nylander
3,325,725 A 6/1967 Nylander
3,327,202 A 6/1967 Mills
3,360,712 A 12/1967 Morgan
3,376,492 A 4/1968 Morgan et al.
3,381,202 A 4/1968 Loucks et al.
3,452,266 A 6/1969 Borden et al.
3,523,239 A 8/1970 Heard
3,559,028 A 1/1971 Studtmann et al.
3,559,029 A 1/1971 Yarema
3,702,961 A 11/1972 Erickson
4,095,165 A 6/1978 Boros
4,109,194 A 8/1978 Miller
4,128,771 A 12/1978 Domenico
4,184,197 A 1/1980 Cuk et al.
4,186,437 A 1/1980 Cuk
4,257,087 A 3/1981 Cuk
4,274,133 A 6/1981 Cuk et al.
4,309,650 A 1/1982 Boros et al.
4,315,316 A 2/1982 Boros et al.
4,325,112 A 4/1982 Otsuka
4,326,160 A 4/1982 Braun
4,353,113 A 10/1982 Billings
4,356,542 A 10/1982 Bruckner et al.
4,395,675 A 7/1983 Toumani
4,488,214 A 12/1984 Chambers
4,523,269 A 6/1985 Baker et al.
4,622,511 A 11/1986 Moore
4,628,426 A 12/1986 Steigerwald
4,654,769 A 3/1987 Middlebrook
4,720,667 A 1/1988 Lee et al.
4,720,668 A 1/1988 Lee et al.
4,725,940 A 2/1988 Henze
4,736,286 A 4/1988 Gulczynski
4,761,725 A 8/1988 Henze
4,801,859 A 1/1989 Dishner
4,803,610 A 2/1989 Gulczynski
4,811,185 A 3/1989 Cook et al.
4,841,220 A 6/1989 Tabisz et al.
4,857,822 A 8/1989 Tabisz et al.
5,013,992 A 5/1991 Eavenson et al.
5,070,294 A 12/1991 Nochi
5,115,185 A 5/1992 Fraidlin et al.
5,119,013 A 6/1992 Sabroff
5,216,351 A 6/1993 Shimoda
5,225,767 A 7/1993 Gulczynski
5,272,614 A 12/1993 Brunk et al.
5,396,165 A 3/1995 Hwang et al.
5,436,823 A 7/1995 Araki
5,442,534 A 8/1995 Cuk et al.
5,442,539 A 8/1995 Cuk et al.
5,450,309 A 9/1995 Rohner
5,475,296 A 12/1995 Vinsant et al.
5,479,089 A 12/1995 Lee
5,513,094 A * 4/1996 Stanley ..... 363/98
5,528,480 A 6/1996 Kikinis et al.
5,568,368 A 10/1996 Steigerwald et al.
5,570,276 A 10/1996 Cuk et al.
5,574,357 A 11/1996 Otake et al.
5,617,015 A 4/1997 Goder et al.
5,619,406 A 4/1997 Divan et al.
5,642,267 A 6/1997 Brkovic et al.
5,677,618 A 10/1997 Fiez et al.
5,677,619 A 10/1997 Doluca
5,731,731 A 3/1998 Wilcox et al.
5,751,139 A 5/1998 Jordan et al.
5,757,634 A 5/1998 Ferens
5,773,969 A 6/1998 Nakayama et al.
5,815,380 A 9/1998 Cuk et al.
5,844,786 A 12/1998 Yoshida et al.
5,847,949 A 12/1998 Jiang
5,862,042 A 1/1999 Jiang
5,870,296 A 2/1999 Schaffer
5,889,392 A 3/1999 Moore et al.
5,912,552 A 6/1999 Tateishi
5,944,885 A 8/1999 Yoshinaka et al.
5,949,658 A 9/1999 Thottuvelil et al.
5,959,855 A 9/1999 Ishii et al.
6,005,377 A 12/1999 Chen et al.
6,023,190 A 2/2000 Wada
6,057,607 A 5/2000 Rader, III et al.
6,075,295 A 6/2000 Li
6,178,101 B1 1/2001 Shires
6,204,651 B1 3/2001 Marcus et al.
6,211,657 B1 4/2001 Goluszek
6,215,290 B1 4/2001 Yang et al.
6,222,352 B1 4/2001 Lenk
6,222,750 B1 4/2001 Swart et al.
6,239,509 B1 5/2001 Rader, III et al.
6,278,263 B1 8/2001 Walters et al.
6,281,666 B1 8/2001 Tressler et al.
6,285,251 B1 9/2001 Dent et al.
6,285,571 B1 * 9/2001 Brooks et al. ..... 363/65
6,304,065 B1 10/2001 Wittenbreder
6,348,779 B1 2/2002 Sluijs
6,355,990 B1 3/2002 Mitchell
6,362,607 B1 * 3/2002 Wickersham et al. ..... 323/272
6,362,608 B1 3/2002 Ashburn et al.
6,433,527 B1 8/2002 Izadinia et al.
6,534,960 B1 3/2003 Wells et al.
6,674,274 B2 1/2004 Hobrecht et al.
6,678,178 B2 1/2004 Lipcsei
6,850,045 B2 * 2/2005 Muratov et al. ..... 323/272
6,873,140 B2 3/2005 Saggini et al.
6,912,144 B1 6/2005 Clavette
6,965,219 B2 11/2005 Brooks et al.
7,265,522 B2 9/2007 Sutardja et al.
7,342,383 B1 3/2008 Song et al.
7,414,383 B2 8/2008 Burton et al.
7,456,618 B2 * 11/2008 Jain ..... H02M 3/157 323/272
7,602,156 B2 10/2009 Weng et al.
7,624,291 B2 11/2009 Nguyen
7,729,144 B2 * 6/2010 Urakabe et al. ..... 363/71
7,888,918 B2 2/2011 Wu et al.
7,948,222 B2 5/2011 Hardman et al.
7,999,519 B2 8/2011 McDonald et al.
7,999,520 B2 8/2011 Luo et al.
8,294,438 B2 10/2012 Wickersham et al.
8,374,008 B2 * 2/2013 Rinne et al. ..... 363/65

OTHER PUBLICATIONS

"Multiphase Buck Converters", PowerGuru, <http://www.powerguru.org/multiphase-buck-converters/>, Nov. 1, 2007, 8 pages.

Application Note 556, "Introduction to Power Supplies," National Semiconductor Corporation, Sep. 2002, 7 pages.

* cited by examiner

ASYMMETRIC TOPOLOGY TO BOOST LOW LOAD EFFICIENCY IN MULTI-PHASE SWITCH-MODE POWER CONVERSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Field of the Invention

This application relates to power converter circuits and more particularly to DC to DC power converter circuits.

2. Description of the Related Art

DC to DC power converter circuits, which are particularly useful in low-power electronic devices, convert a source of direct current from a first voltage level to a second voltage level (FIG. 1). A typical switch-mode (i.e., switched, switched-mode, switch-mode, switching-mode, etc.) DC to DC power converter converts the first voltage level to the second voltage level by temporarily storing energy in a magnetic component (e.g., an inductor or transformer) or a capacitor circuit (e.g., switched capacitor circuit) and then releasing the energy, at a different voltage, from the magnetic component to a load. In general, actual switch-mode DC to DC power supply designs have less than 100% conversion efficiency and provide an output voltage that has an error voltage characterized by a ripple voltage variation having a periodic amplitude variation from a target constant voltage level.

SUMMARY

Techniques for performing DC to DC power conversion in a switch-mode converter circuit include combinations of dynamic switch shedding, phase shedding, symmetric phase circuit topologies, and asymmetric phase circuit topologies. In at least one embodiment of the invention, a method of operating a power converter circuit includes operating a first phase switch circuit portion using a first number of switch devices when the power converter circuit is configured in a first mode of operation. The first number is greater than zero. The method includes operating the first phase switch circuit portion using the first number of switch devices when the power converter circuit is configured in a second mode of operation. The method includes operating a second phase switch circuit portion using a second number of switch devices when the power converter circuit is configured in the second mode of operation. The second number is greater than the first number.

In at least one embodiment of the invention, a method of operating a power converter circuit includes selectively disabling at least one switch device of a plurality of switch devices in a corresponding phase circuit of a plurality of phase circuits, at least partially based on a signal indicative of a load coupled to the power converter circuit. At least one switch device of the corresponding phase circuit is selectively disabled while at least one other switch device of the corresponding phase circuit is selectively enabled.

In at least one embodiment of the invention, an apparatus includes a power converter circuit portion. The power converter circuit portion includes a first phase switch circuit portion configured to operate using a first number of switch devices when the power converter circuit is configured in a first mode of operation. The first number is greater than zero. The first phase switch circuit portion is configured to operate using the first number of switch devices when the power converter circuit is configured in a second mode of operation. The power converter circuit portion includes at least a second phase switch circuit portion configured to operate using a second number of switch devices when the power converter circuit is configured in the second mode of operation. The second number is greater than the first number.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
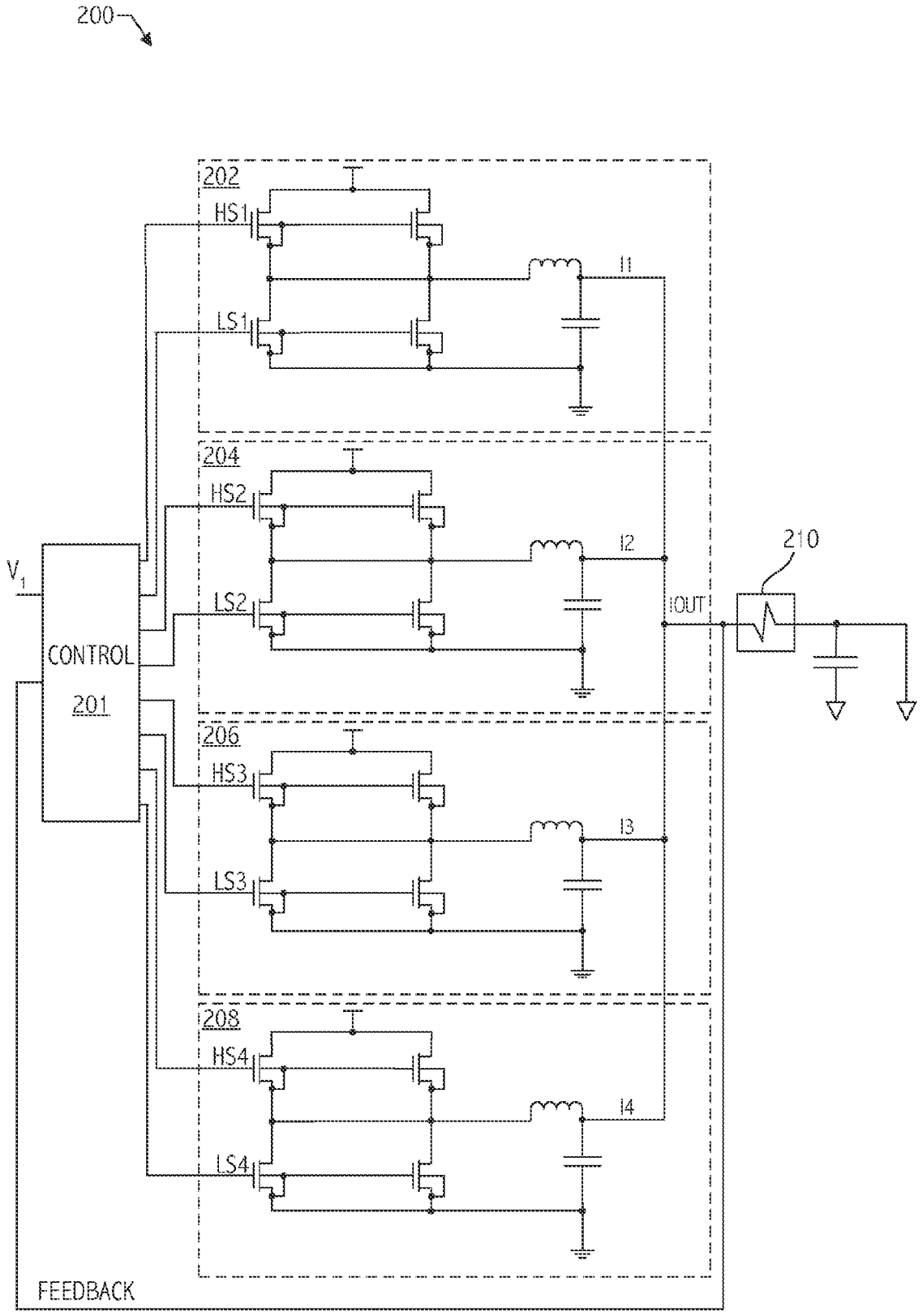
FIG. 2 illustrates a system including an exemplary power converter circuit.

A typical switch-mode DC to DC power converter (hereinafter, "switch-mode converter") controls the output voltage by adjusting a duty cycle of a pulse-width modulated (i.e., PWM) signal. The PWM signal periodically opens and closes one or more switches to build up charge in an inductor. The average output voltage is a function of the duty cycle of the PWM signal, the period of the PWM signal, and the input voltage. One technique for increasing the efficiency (e.g., power out/power in) of a switch-mode converter design includes multiple switch-mode converters (i.e., multiple phase circuits) coupled in parallel to deliver power to a load, which may be a microprocessor or other suitable load. Referring to FIG. 2, multiple phase circuits (e.g., phase circuits 202, 204, 206, and 208) are coupled in parallel to provide an output current (e.g., IOUT) that is the sum of the individual output currents (e.g., I1, I2, I3, and I4) of corresponding phase circuits. An individual phase circuit typically includes a switch circuit portion coupled to a passive circuit portion, e.g., a capacitor and/or an inductor. A controller (e.g., control circuit 201) selectively enables only one of those phase circuits at a time.

Figure 1:
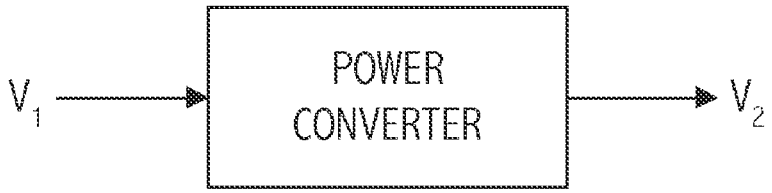
FIG. 1 is a block diagram of a power converter circuit.
Figure 3:
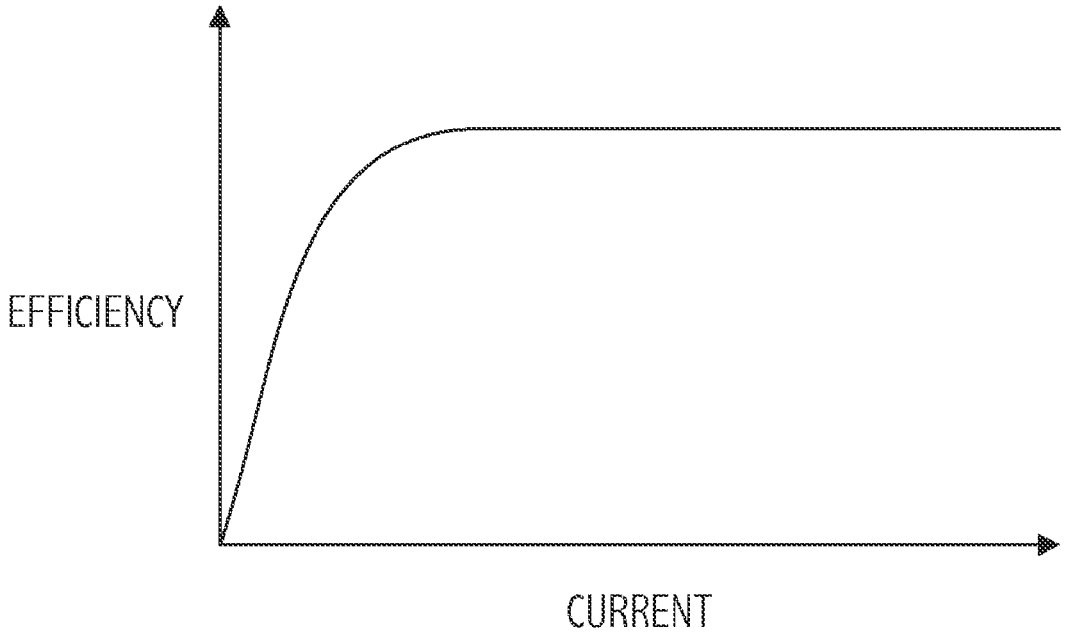
FIG. 3 illustrates efficiency as a function of current for a power converter circuit consistent with FIG. 2.

The resulting switch-mode converter has improved ripple characteristics (e.g., reduced output ripple voltage amplitude) as compared to a switch-mode converter without multiple phase circuits, but has low output current efficiency. A phase shedding technique improves the efficiency by disabling as many phase circuits as possible in response to a feedback signal indicative of low output current. At high output current, all of the phase circuits are used and conduction loss is a substantial factor in efficiency degradation. However, although at low output current the frequency of the ripple voltage decreases, use of fewer phase circuits increases the amplitude of the output ripple voltage and switch loss substantially degrades efficiency (FIG. 3).

Figure 4:
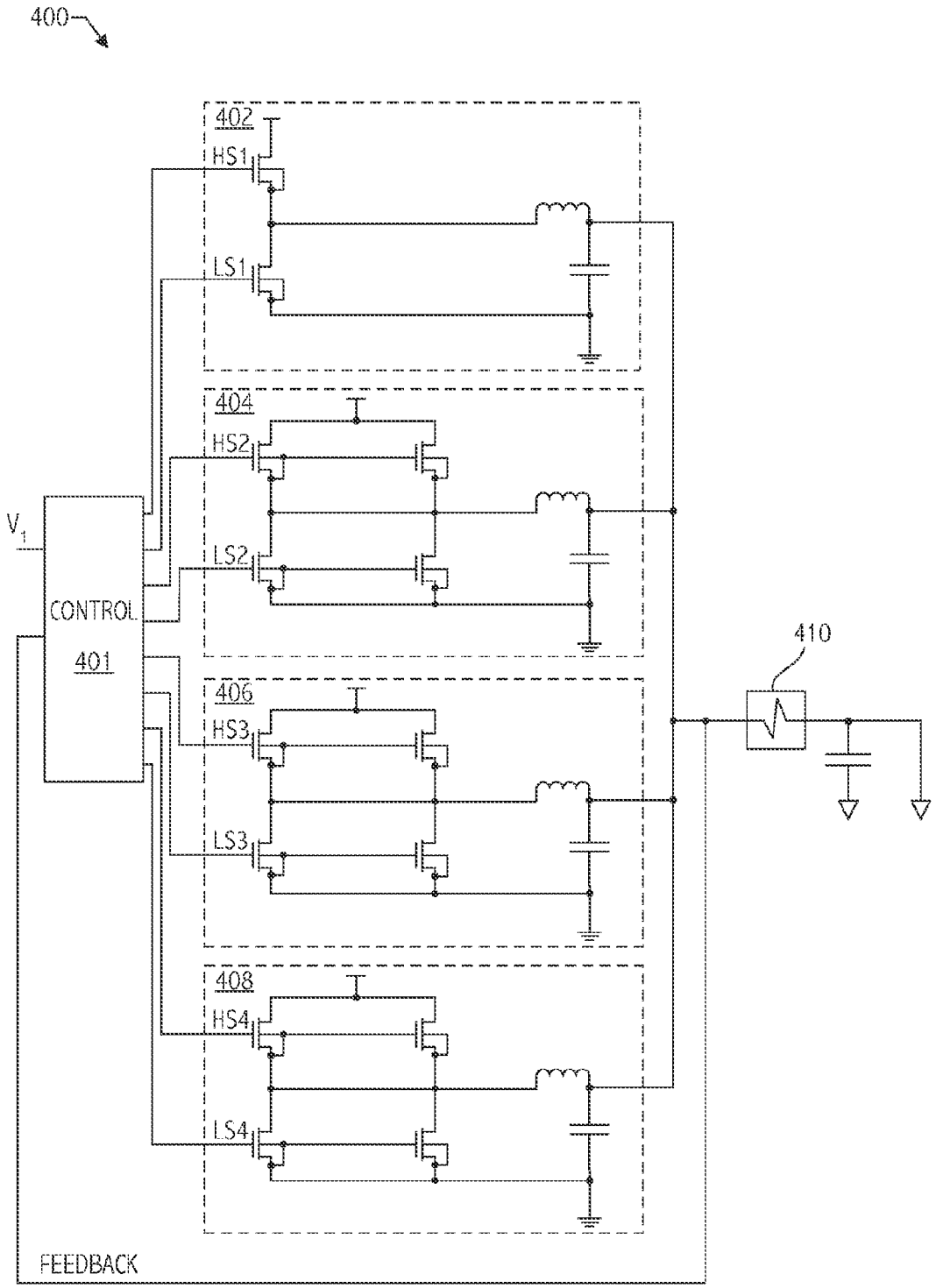
FIG. 4 illustrates a system including an exemplary power converter circuit consistent with at least one embodiment of the invention.
Figure 5:
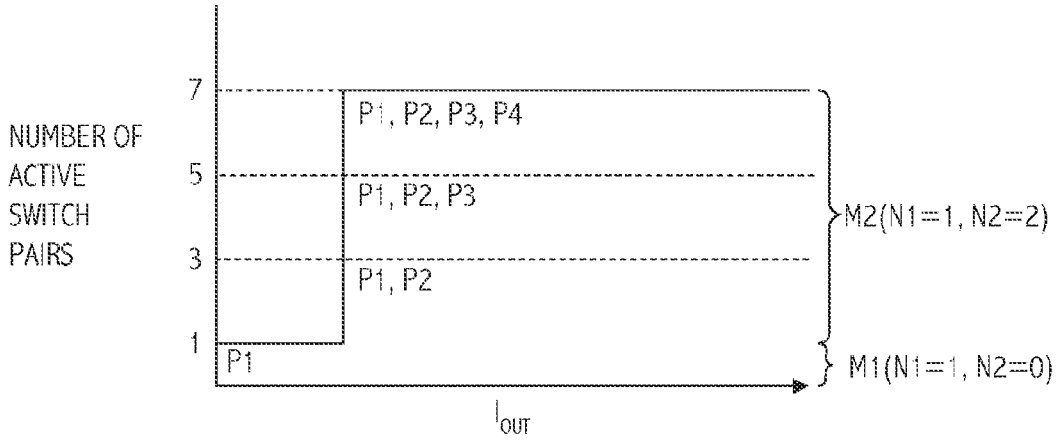
FIG. 5 illustrates exemplary configurations of the exemplary power converter circuit of FIG. 4, consistent with at least one embodiment of the invention.

Referring to FIGS. 4 and 5, in at least one embodiment of a switch-mode converter circuit, asymmetric phase circuits are used, i.e., individual phase circuits have different numbers of selectively enabled switch pairs. As referred to herein, a selectively enabled switch circuit or switch pair generates a periodic voltage signal that has a duty cycle between 0% and 100%. Using different phase circuit topologies, a switch-mode converter may be configured to have a first topology (e.g., the topology of mode M1, having one enabled switch pair) that has a particular efficiency at low output current and configured to have a second topology (e.g., one of the topologies of mode M2, having three, five, or seven enabled switch pairs) for a particular efficiency at high output currents. For example, switch-mode converter 400 includes phase circuit 402, which has a one-up, one-down topology (i.e., one high-side switch and one low-side switch) for operating at low output current. Phase circuits 404, 406, and 408 each have a two-up, two-down topology that operates more efficiently at high output currents than the one-up, one-down topology. Phase shedding techniques vary the number of enabled phase circuits (i.e., the number of phase circuits that contribute to the output voltage) in response to a feedback signal indicative of changes in the output current, load, or proxy therefor. For example, the number of enabled phase circuits may be reduced from four, to three, to two, to one, as the output current decreases, thereby reducing a number of enabled switch pairs from seven to five to one. Phase circuit 402, which remains enabled at low output current, includes only one switch pair, as compared to the other additional phase circuits, Which are enabled at higher output currents and which include two switch pairs. Note that in other embodiments, different numbers, types, and configurations of switches may be used.

Figure 7:
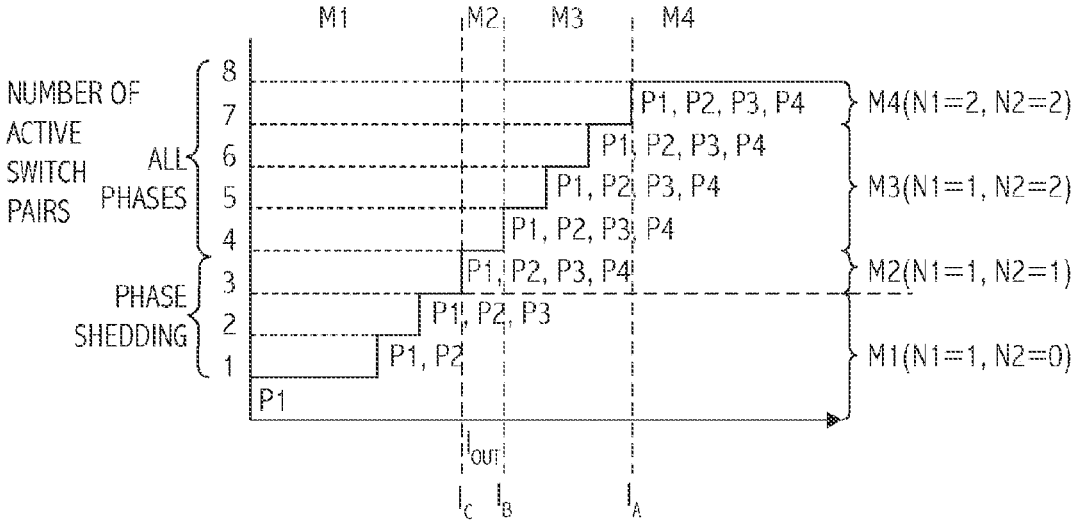
FIG. 7 illustrates exemplary configurations of the exemplary power converter circuit of FIG. 6, consistent with at least one embodiment of the invention.
Figure 6:
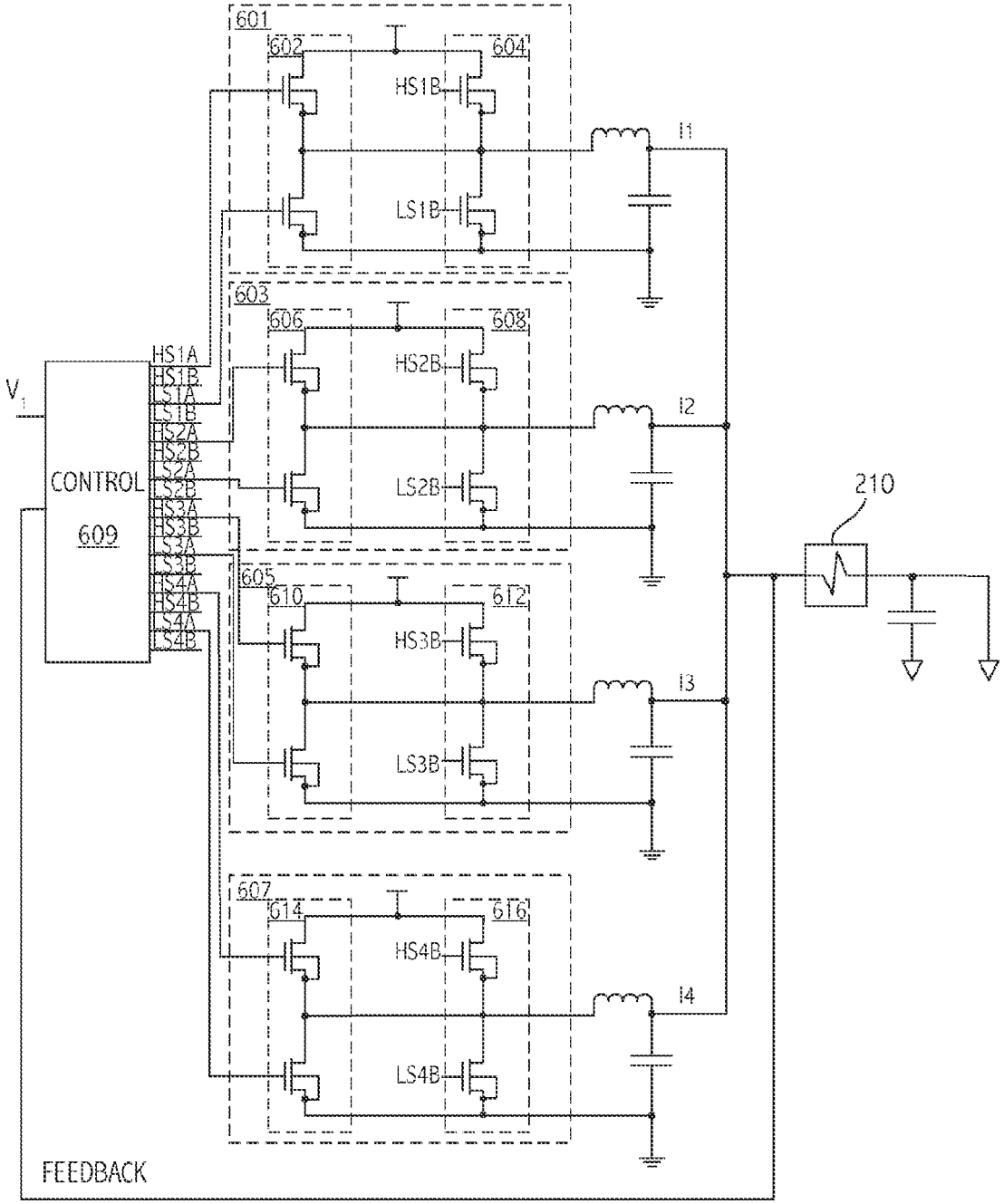
FIG. 6 illustrates a system including an exemplary power converter circuit consistent with at least one embodiment of the invention.

Referring to FIGS. 6 and 7, in at least one embodiment of a switch-mode converter circuit, controller 609 implements a dynamic switch-shedding technique. individual switch pairs of an individual phase circuit may be selectively enabled or disabled in response to a feedback signal indicative of variations in the output current. For example, rather than disabling an entire phase circuit as current decreases, individual phase circuits remain enabled, but with fewer switch pairs contributing to the output of the switch-mode converter circuit. Phase circuits 601, 603, 605, and 607 each include two switch pairs (e.g., corresponding ones of switch pairs 602, 604, 606, 608, 610, 612, 614, and 616). As the output current decreases, prior to phase shedding, controller 609 effectively downsizes at least one of individual phase circuits 601, 603, 605, and 607 from a first topology with a first number of enabled switches to a second topology having a fewer number of enabled switches.

For example, when configured in a first mode in which all of the phase circuits are enabled and all of the switch pairs of each phase circuit are enabled (e.g., mode M4, having eight enabled switch pairs), as output current decreases, controller 609 selectively disables at least one individual switch pair to configure the switch-mode converter circuit in a mode having all phase circuits active, but less than all switches of at least one phase circuit enabled, and at least two phase circuits having different numbers of enabled switch pairs (e.g., mode M3, having four enabled phase circuits and seven enabled switch pairs). If output current continues to decrease, controller 609 disables additional switch pairs (e.g., mode M3 having four enabled phase circuits and six enabled switch pairs, then only five enabled switch pairs). Note that all states of mode M3 are asymmetric, i.e., all enabled phase circuits do not include the same numbers of enabled switch pairs, as compared to modes M1, M2, and M4, which are symmetric, i.e., all enabled phase circuits include the same numbers of enabled switch pairs.

If output current continues to decrease, controller 609 disables at least one additional switch pair to configure the switch-mode converter circuit in a mode having all phase circuits active and all phase circuits having the same number of active switch pairs, but less than the total number of switch pairs included in the individual phase circuits (e.g., mode M2, having four enabled phase circuits and four enabled switch pairs, one pair enabled in each phase circuit). If output current continues to decrease, controller 609 may shed phase circuits to enter a mode with less than all phase circuits enabled and less than all available switch pairs enabled in each enabled phase circuit (e.g., mode M1, having three enabled phase circuits with a total of three enabled switch pairs, then two enabled phase circuits with a total of two enabled switch pairs, and then one enabled phase circuit with one enabled switch pair). Note that controller 609 sheds switch pairs prior to shedding phase circuits. In other embodiments of a switch-mode converter circuit, different numbers of switches and/or switch pairs are included in the switch-mode converter circuit and different combinations of switches may be enabled in other combinations of modes.

Figure 8:
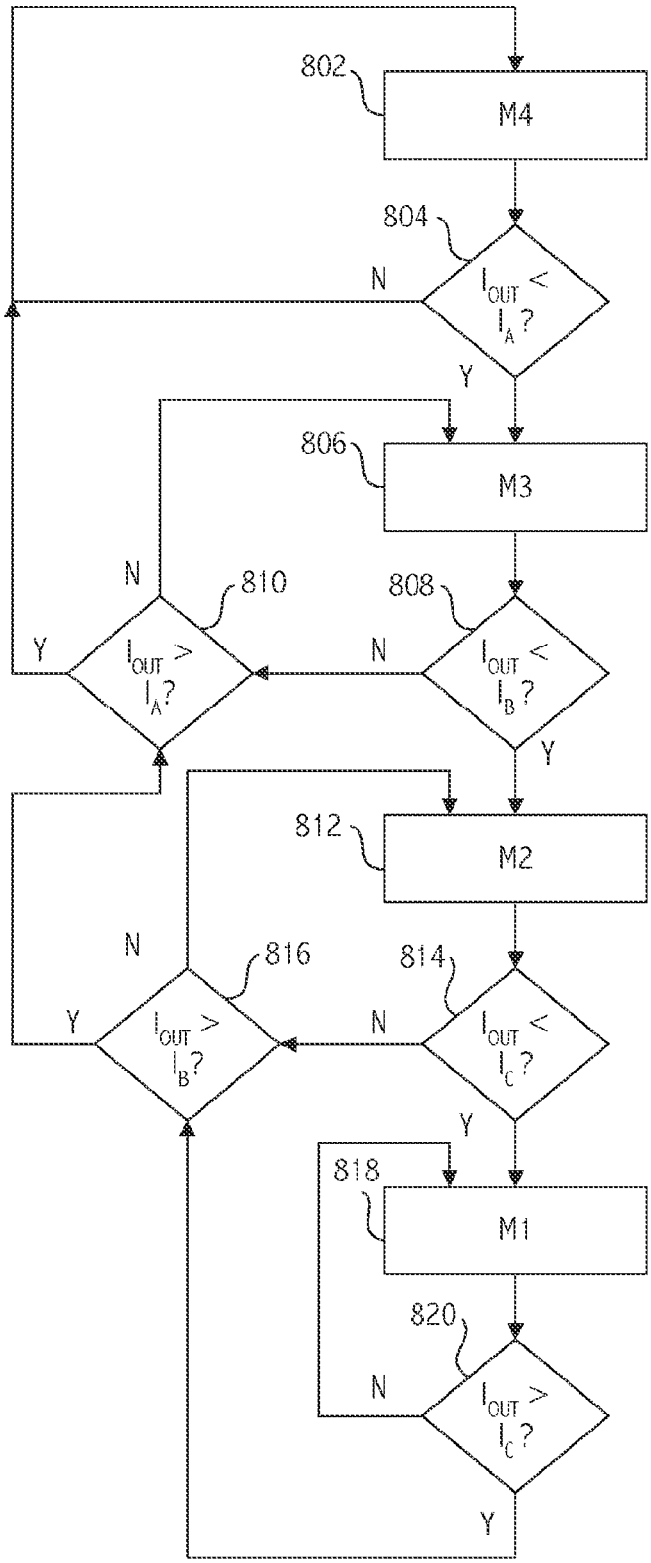
FIG. 8 illustrates exemplary information and control flows associated with the exemplary power converter circuit of FIG. 6, consistent with at least one embodiment of the invention.

Referring to FIG. 8, an exemplary control sequence implemented by a controller in a switch-mode converter circuit varies the number of enabled switches and enabled phase circuits of a switch-mode converter circuit consistent with FIGS. 6 and 7, based on a feedback signal indicative of an output current, load, or a proxy therefor. At high output current, the switch-mode converter circuit is configured in mode M4, as described above. If the output current falls below a predetermined current value (804), e.g., $I_A$, then control circuit 609 sheds at least one switch pair and configures the switch-mode converter circuit in mode M3; otherwise, the switch-mode converter circuit remains in mode M4.

In mode M3 (806), controller 609 uses a switch shedding technique to adjust the number of enabled switches based on the feedback signal indicative of output current, load or a proxy therefor. Note that all phase circuits are enabled in mode M3, but all states have asymmetric topologies. While in mode M3, if the output current falls below a second predetermined current value as indicated by the feedback signal (808), e.g., $I_B$, then control circuit 609 uses switch shedding to configure the switch-mode converter circuit in mode M2 (812), which has a symmetric topology. While in mode M3, if the output current is not below the second predetermined current value (808) and is greater than the first predetermined current level (810), then controller 609 configures the switch-mode converter circuit in mode M4 by enabling additional switches. Otherwise, the switch-mode converter circuit remains in mode M3.

While in mode M2 (812), all phase circuits are enabled. In mode M2, controller 609 uses phase shedding if the output current falls below a third predetermined current value, thereby transitioning to mode M1. While in mode M2, if the output current is not less than the third predetermined current value (814), and does not exceed the second predetermined current value (816), then the switch-mode converter circuit remains in mode M2. However, while in mode M2, if the output current is not less than the third predetermined current value (814), exceeds the second predetermined current value (816), and does not exceed the first predetermined current value (810), then controller 609 configures the switch-mode converter circuit in mode M3. While in mode M2, if the output current is not less than the third predetermined current value (814), exceeds the second predetermined current value (816), and exceeds the first predetermined current value (810), then controller 609 configures the switch-mode converter circuit in mode M4.

In mode M1, less than all phase circuits are enabled and control circuit 609 adjusts the number of enabled phase circuits based on the feedback signal indicative of the output current, load, or a proxy therefor. While in mode M1, if the output current exceeds the third predetermined current value (820) and does not exceed the second predetermined current value (816), additional phase circuits are enabled and controller 609 configures the switch-mode converter circuit in mode M2. While in mode M1, if the output current exceeds the third predetermined current value (820) and exceeds the second predetermined current value (816), but does not exceed the first predetermined current value (810), controller 609 enables additional phase circuits and additional switches to configure the switch-mode converter circuit in mode M3. While in mode M1, if the output current exceeds the third predetermined current value (820), exceeds the second predetermined current value (816), and exceeds the first predetermined current value (810), controller 609 enables additional phase circuits and additional switches, thereby configuring the switch-mode converter circuit for high output current in mode M4.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method of operating a power converter circuit comprising:

[operating a first phase switch circuit portion using a first number of switch devices when the power converter circuit is configured in a first mode of operation, the first number being greater than zero;]

operating [the] *a* first phase switch circuit portion using [the] *a* first number of switch devices when the power converter circuit is configured in a [second] *first* mode of operation*, the first number being greater than zero*; [and]

operating a second phase switch circuit portion using a second number of switch devices when the power converter circuit is configured in the [second] *first* mode of operation, the second number being greater than the first number*; and*

*operating the second phase switch circuit portion with the first number of switch devices when the power converter circuit is configured in a second mode of operation.*

[2. The method, as recited in claim 1, further comprising:

operating the second phase switch circuit portion with the first number of switch devices when the power converter circuit is configured in the first mode of operation.]

3. The method, as recited in claim 1, further comprising:

selecting the [first] *second* mode of operation as a next mode of operation when the power converter circuit is in the [second] *first* mode of operation and in response to a reduction in output power.

4. The method, as recited in claim 1, further comprising:

operating the firs: phase switch circuit with a third number of devices when the power converter circuit is configured in a third mode of operation, the third number being greater than the first number; and operating the second phase switch circuit portion with the third number of switch devices in the third mode of operation.

5. The method, as recited in claim 4, further comprising:

selecting the [first] *second* mode of operation as a next mode of operation in response to a reduction in output power and when the power converter circuit is configured in the second mode of operation or the third mode of operation.

6. The method, as recited in claim 1, wherein when the power converter circuit is configured in the [first] *second* mode of operation, the second phase switch circuit is configured to be inoperable.

7. The method, as recited in claim 1, wherein the first mode is a low power mode and the second mode is a higher power mode.

8. The method, as recited in claim 1, wherein efficiency of the first phase switch circuit is greater than efficiency of the second phase switch circuit for a low output current mode and the efficiency of the second phase switch circuit is greater than the efficiency of the first phase switch circuit for a high output current mode.

9. The method, as recited in claim 1, further comprising:

selecting a mode of operation at least partially based on a feedback signal, the mode of operation being selected from a plurality of modes of operation including at least the first [and second modes] *mode* of operation.

10. [The method, as recited in claim 1, further comprising:] *A method of operating a power converter circuit comprising:*

*operating a first phase switch circuit portion using a first number of switch devices when the power converter circuit is configured in a first mode of operation, the first number being greater than zero;*

*operating a second phase switch circuit portion using a second number of switch devices when the power*

*converter circuit is configured in the first mode of operation, the second number being greater than the first number; and* reducing a total number of active switch pairs in the power converter circuit prior to reducing [the] *a* number of active phase switch circuit portions in response to an increasing reduction in output power.

11. The method, as recited in claim 1, further comprising:

allocating current to individual phase switch circuit portions at least partially based on a selected mode of operation of the power converter circuit.

12. A method of operating a *multi-phase switched* power converter circuit comprising:

selectively disabling at least one switch device of a plurality of switch devices in a corresponding phase circuit of a plurality of phase circuits, at least partially based on a signal indicative of a load coupled to the power converter circuit, wherein the at least one switch device of the corresponding phase circuit is selectively disabled while at least one other switch device of the corresponding phase circuit is selectively enabled*; and*

*reducing a total number of active switch pairs in the power converter circuit prior to reducing a number of active phase switch circuit portions in response to an increasing reduction in output power.*

13. The method, as recited in claim 12, wherein [the] selectively enabled switch devices form an asymmetric power converter circuit including at least one phase switch circuit portion having a different number of enabled switch devices than at least one other phase switch circuit portion of the plurality of phase switch circuit portions.

[14. The method, as recited in claim 12, wherein the power converter circuit is configured to reduce a total number of active switch pairs in the power converter circuit prior to reducing the number of active phase switch circuit portions in response to an increasing reduction in output power.]

15. The method, as recited in claim 12, further comprising:

distributing current provided by the power converter circuit to individual phase switch circuit portions according to a number of devices selectively disabled in individual phase switch circuit portions.

16. An apparatus comprising:

a power converter circuit portion comprising:

a first phase switch circuit portion configured to operate using a first number of switch devices when the power converter circuit is configured in a first mode of operation, the first number being greater than zero and configured to operate using the first number of switch devices when the power converter circuit is configured in a second mode of operation; and at least a second phase switch circuit portion configured to operate using a second number of switch devices when the power converter circuit is configured in the second mode of operation, the second number being greater than the first number*;*

*wherein the second phase switch circuit portion is configured to operate using the first number of switch devices when the power converter circuit is configured in the first mode of operation.*

[17. The apparatus, as recited in claim 16, wherein the second phase switch circuit portion is configured to operate using the first number of switch devices when the power converter circuit is configured in the first mode of operation.]

18. [The apparatus, as recited in claim 16,] *An apparatus comprising:*

*a power converter circuit portion comprising:*

*a first phase switch circuit portion configured to operate using a first number of switch devices when the power converter circuit is configured in a first mode of operation, the first number being greater than zero and configured to operate using the first number of switch devices when the power converter circuit is configured in a second mode of operation; and*

*at least a second phase switch circuit portion configured to operate using a second number of switch devices when the power converter circuit is configured in the second mode of operation, the second number being greater than the first number;* wherein the first phase switch circuit is configured to operate with a third number of devices when the power converter circuit *portion* is configured in a third mode of operation, the third number being greater than the first number, and wherein the second phase switch circuit *portion* is configured to operate with the third number of switch devices when the power converter circuit is configured in the third mode of operation.

19. The apparatus, as recited in claim 16, wherein the second phase switch circuit *portion* is configured to be inoperable when the power converter circuit is configured in the first mode of operation.

20. The apparatus, as recited in claim 16, wherein the first mode of operation is a low power mode and the second mode of operation is a higher power mode.

21. The apparatus, as recited in claim 16, wherein efficiency of the first phase switch circuit is greater than efficiency of the second phase switch circuit *portion* for a low output current and the efficiency of the second phase switch circuit *portion* is greater than the efficiency of the first phase switch circuit *portion* for a high output current.

22. The apparatus, as recited in claim 16, further comprising:

a controller circuit portion configured to select a mode of operation at least partially based on a feedback signal, the mode of operation being selected from a plurality of modes of operation including at least the first and second modes of operation; and a node coupled to a first phase circuit comprising the first phase switch circuit and coupled to a second phase circuit comprising the second phase switch circuit *portion*, the node being configured to deliver power to a load.

23. The apparatus, as recited in claim 22, wherein the controller circuit is configured to select [a] *the* mode of operation with a reduced total number of active switch pairs in the power converter circuit prior to selecting [a] *the* mode of operation with a reduced number of active phase switch circuit portions in response to an increasing reduction in output power.

*24. The method, as recited in claim 1, further comprising:*

*operating the first phase switch circuit portion using the first number of switch devices when the power converter circuit is configured in the second mode of operation, the first number being greater than zero.*

* * * * *